United States Patent
Mohan et al.

(10) Patent No.: US 10,946,977 B2
(45) Date of Patent: Mar. 16, 2021

(54) METHOD AND SYSTEM FOR INTEGRATING OFFBOARD GENERATED PARAMETERS INTO A FLIGHT MANAGEMENT SYSTEM

(71) Applicant: HONEYWELL INTERNATIONAL INC., Morris Plains, NJ (US)

(72) Inventors: Rajeev Mohan, Karnataka (IN); Sreenivasan Govindillam K, Karnataka (IN); Srihari Jayathirtha, Karnataka (IN); Kalimulla Khan, Karnataka (IN); Ravish Udupa, Karnataka (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 512 days.

(21) Appl. No.: 15/959,485

(22) Filed: Apr. 23, 2018

(65) Prior Publication Data

US 2019/0152619 A1    May 23, 2019

(30) Foreign Application Priority Data

Nov. 20, 2017    (IN) .............................. 201711041473

(51) Int. Cl.
*G08G 5/00* (2006.01)
*G01C 21/00* (2006.01)
(Continued)

(52) U.S. Cl.
CPC .............. *B64D 43/00* (2013.01); *G08G 5/003* (2013.01); *G08G 5/0021* (2013.01); *B64D 2045/0075* (2013.01)

(58) Field of Classification Search
None
See application file for complete search history.

(56) References Cited

U.S. PATENT DOCUMENTS 8,515,658 B1 * 8/2013 Foster .................. G01C 23/005
                                                          701/456
9,260,182 B2 * 2/2016 Hathaway .......... H04B 7/18506
(Continued)

FOREIGN PATENT DOCUMENTS

WO    2016042036 A1    3/2016

OTHER PUBLICATIONS

Wing, D.J. et al; Developing an Onboard Traffic-Aware Flight Optimization Capability for Near-Term Low-Cost Implementation; American Institute of Aeronautics and Astronautics; https://ntrs.nasa.gov/search.jsp?R=20140001085 2017-12-11T08:40:49+00:00Z.
(Continued)

*Primary Examiner* — Jonathan M Dager
(74) *Attorney, Agent, or Firm* — Lorenz & Kopf, LLP

(57) ABSTRACT

Methods and systems are provided for integrating aircraft flight parameters generated by an offboard portable electronic device (PED) into an onboard flight management system (FMS). The method comprises selecting the aircraft flight parameters to be generated by the PED for use by the FMS. The current flight data is accessed for the aircraft with the FMS and providing the current flight data to the offboard PED. The rules for the aircraft flight parameters are computed with the offboard PED based on the current flight data for the aircraft and transmitted to a flight management (FM) adapter. The FM adapter confirms that the rules for the aircraft flight parameters comply with operational limits of the aircraft and then translates the rules of the aircraft flight parameters to aircraft operational targets for use by the onboard FMS. The aircraft operational targets are then loaded from the FM adapter into the FMS.

18 Claims, 6 Drawing Sheets

(51) Int. Cl.
    *B64D 43/00*     (2006.01)
    *B64D 45/00*     (2006.01)

(56) References Cited

U.S. PATENT DOCUMENTS

| | | | |
|---|---|---|---|
| 9,284,045 B1 | 3/2016 | Springer et al. | |
| 9,330,573 B2* | 5/2016 | Brandao | G08G 5/0013 |
| 9,640,079 B1* | 5/2017 | Moravek | G01C 21/20 |
| 10,275,950 B2* | 4/2019 | Girard | G07C 5/008 |
| 2005/0049762 A1* | 3/2005 | Dwyer | G01C 23/00 |
| | | | 701/3 |
| 2007/0219676 A1* | 9/2007 | Allen | G01C 23/00 |
| | | | 701/3 |
| 2008/0215193 A1* | 9/2008 | Hanson | G01C 23/00 |
| | | | 701/3 |
| 2009/0150012 A1* | 6/2009 | Agam | G01C 23/005 |
| | | | 701/3 |
| 2010/0105329 A1* | 4/2010 | Durand | H04B 1/3877 |
| | | | 455/41.2 |
| 2010/0152924 A1* | 6/2010 | Pandit | G01C 23/00 |
| | | | 701/3 |
| 2012/0035849 A1* | 2/2012 | Clark | G01C 23/00 |
| | | | 701/467 |
| 2012/0265372 A1* | 10/2012 | Hedrick | H04L 67/36 |
| | | | 701/3 |
| 2013/0046422 A1* | 2/2013 | Cabos | G08G 5/006 |
| | | | 701/3 |
| 2013/0232237 A1 | 9/2013 | Zulch, III et al. | |
| 2013/0305391 A1 | 11/2013 | Haukom et al. | |
| 2014/0074322 A1* | 3/2014 | Baumgarten | G06F 13/4282 |
| | | | 701/3 |
| 2014/0309821 A1* | 10/2014 | Poux | B64D 45/00 |
| | | | 701/14 |
| 2014/0343765 A1* | 11/2014 | Suiter | G08G 5/0021 |
| | | | 701/18 |
| 2015/0019862 A1 | 1/2015 | Uczekaj et al. | |
| 2015/0081197 A1* | 3/2015 | Gaertner | G08G 5/0021 |
| | | | 701/120 |
| 2015/0279218 A1* | 10/2015 | Irrgang | G08G 5/0056 |
| | | | 701/3 |
| 2015/0323933 A1* | 11/2015 | Darbois | G05D 1/0005 |
| | | | 701/4 |
| 2015/0371544 A1* | 12/2015 | Mere | G08G 5/0039 |
| | | | 701/3 |
| 2016/0019732 A1 | 1/2016 | Fournier et al. | |
| 2016/0019793 A1* | 1/2016 | Fournier | G08G 5/0034 |
| | | | 701/400 |
| 2016/0093217 A1 | 3/2016 | Hale | |
| 2016/0180715 A1* | 6/2016 | Burke | G08G 5/0013 |
| | | | 701/467 |
| 2016/0379500 A1 | 12/2016 | Garrido | |
| 2017/0138739 A1* | 5/2017 | Block | G01C 23/00 |
| 2017/0183105 A1* | 6/2017 | Fournier | G08G 5/0052 |
| 2017/0221367 A1* | 8/2017 | Kawalkar | G08G 5/0021 |
| 2017/0249849 A1* | 8/2017 | De Prins | G01C 23/005 |
| 2017/0251501 A1* | 8/2017 | Batsakes | B64D 43/00 |
| 2017/0301246 A1* | 10/2017 | De Prins | G08G 5/0091 |
| 2018/0075757 A1* | 3/2018 | Estes | G08G 5/025 |
| 2018/0144643 A1* | 5/2018 | Moravek | G08G 5/0021 |
| 2018/0261104 A1* | 9/2018 | Jonak | G08G 5/0039 |
| 2018/0307323 A1* | 10/2018 | Lafon | G06F 3/167 |
| 2018/0327110 A1* | 11/2018 | Shanbhag | G08G 5/0034 |
| 2019/0213891 A1* | 7/2019 | Snyder | G08G 5/0013 |
| 2020/0168104 A1* | 5/2020 | Holder | G08G 5/0039 |

OTHER PUBLICATIONS

Extended European Search Report for Application No. 18206362.9 dated Jan. 7, 2019.

\* cited by examiner

METHOD AND SYSTEM FOR INTEGRATING OFFBOARD GENERATED PARAMETERS INTO A FLIGHT MANAGEMENT SYSTEM

CROSS-REFERENCE TO RELATED APPLICATION(S)

This application claims priority from Indian Provisional Patent Application No. 201711041473, titled "Method and System for Integrating Offboard Generated Parameters into a Flight Management System" that was filed Nov. 20, 2017.

TECHNICAL FIELD

The present invention generally relates to aircraft operations, and more particularly relates to a method for integrating offboard generated flight parameters into a flight management system.

BACKGROUND

Advances in avionics have made a significant impact on improving operating efficiency and reducing costs for airlines. However, many aircraft fly without advanced avionics and instead use equipment with older or limited features. The limitations in hardware capacity may be due to older aircraft that lack an adequate processor and display systems to meet the demands of the latest avionics hardware and software. Aircraft operators may postpone or opt not to upgrade the avionics due to significant equipment and certification costs. However, regulatory authorities such as the Federal Aviation Administration (FAA) have certified the use of portable electronic devices (PED) that are equipped with high-performance processors to be used to overcome limitations of installed systems on board the aircraft. These "off-board" devices are used as supplementary computing systems to provide the latest avionics capabilities.

Hence, there is a need for a method and system for integrating offboard generated parameters into a flight management system.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A method is provided for integrating aircraft flight parameters generated by an offboard portable electronic device (PED) into an onboard flight management system (FMS). The method comprises: selecting the aircraft flight parameters to be generated for use by the FMS; accessing current flight data for the aircraft with the FMS and providing the current flight data to the offboard PED; computing rules for the aircraft flight parameters with the offboard PED based on the current flight data for the aircraft; transmitting the rules for the aircraft flight parameters to a flight management (FM) adapter; confirming with the FM adapter that the rules for the aircraft flight parameters comply with operational limits of the aircraft; translating with the FM adapter the rules of the aircraft flight parameters with the FM adapter to aircraft operational targets for use by the onboard FMS; and loading the aircraft operational targets from the FM adapter into the FMS.

A system is provided for integrating aircraft flight parameters generated offboard an aircraft into an onboard management device. The system comprises: a portable electronic device (PED) that retrieves selected current flight data from a flight data source, where the PED computes rules for selected aircraft flight parameters based on the current flight data; a flight management (FM) adapter that receives the computed rules for the selected flight parameters from the PED, where the FM adapter confirms that the computed rules comply with the operational limits of the aircraft and translates the computed ruled into aircraft operational targets; and a flight management system (FMS) that receives and loads the aircraft operational targets from the FM adapter.

Furthermore, other desirable features and characteristics of the method and system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

A method and system for integrating offboard generated parameters for a flight management system (FMS) has been developed. In some embodiments, portable electronic devices (PEDs) such as smart tablets have been certified for use on board an aircraft to supplement existing avionics systems such as an FMS. Such devices may use Android, iOS and Microsoft operating systems devices. Examples of supplementary flight parameters and information provided by these devices include flight optimization information such as an optimum cruise altitude selector (OCAS), PACE Labs' Flight Optimizer, etc. Other types of supplemental flight parameters may include a pre-flight planner such as a GDC Flight Planner, in trail procedures (ITP), etc. Still other information may include wake turbulence profiles along with updated maps and charts. An aircrew member may manually input the results from applications loaded onto devices such as a smart tablet or electronic flight bag (EFB) into installed onboard equipment such as an FMS.

Figure 1:
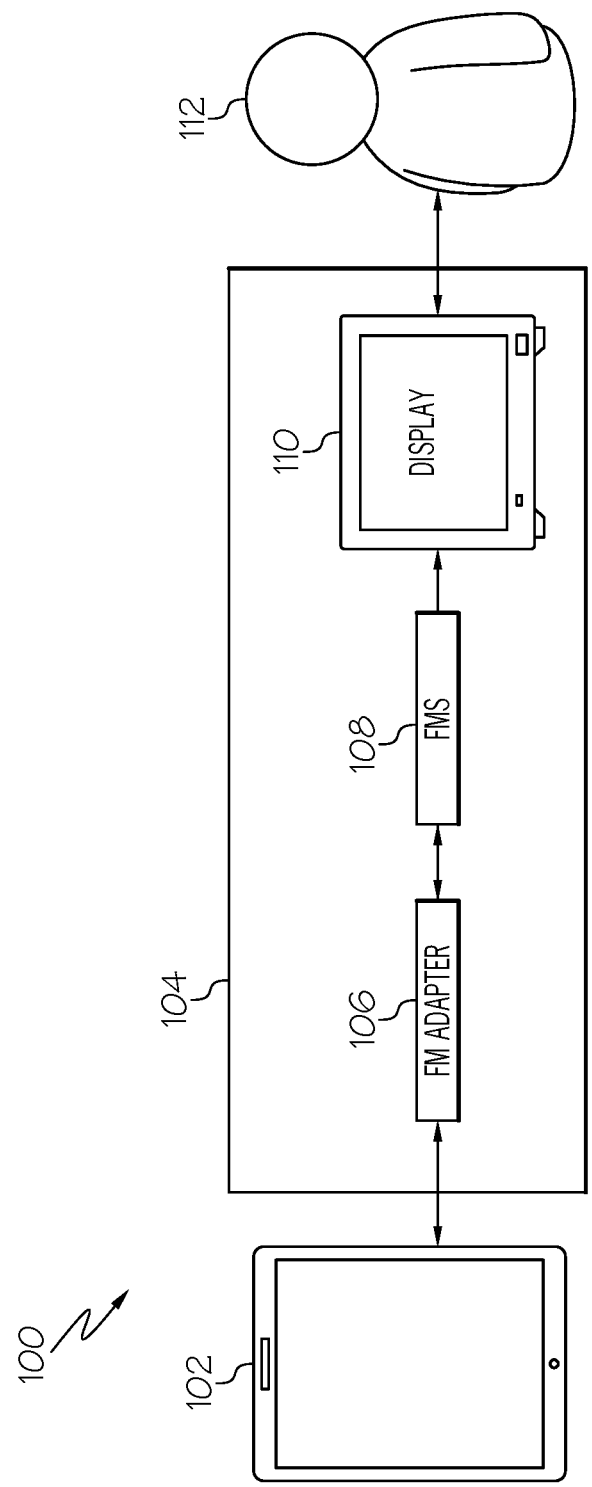
FIG. 1 shows a block diagram of a system for integrating a portable electronic device (PED) into an onboard flight management system (FMS) in accordance with one embodiment.

Turning now to FIG. 1, a block diagram 100 of a system for integrating a PED 102 into an onboard FMS 108 is shown in accordance with one embodiment. The PED 102 may be used to augment onboard avionics 104 for implementing several features that require periodic input feed. In this example, the PED 102 performs computations and generates a speed target for the aircraft. The PED 102 relies on a flight management (FM) adapter 106 to connect to the onboard avionics such as an FMS 108 in order to retrieve current aircraft state performance data used by the PED. As previously stated, the PED 102 performs required computations and periodically produces data which is fed into the onboard avionics 104 directly with minimal aircrew 112 supervision. The onboard systems 104 are utilized for providing a graphical preview with the onboard display systems such as a vertical situation display/navigation display (VSD/ND) 110.

In some embodiments, the display 110 includes a go/no-go color-coded decision aid that enables the aircrew 112 to look quickly, and intuitively accept, review, or reject the provisional speed target from the PED 102. After a default specified time period, the input from the PED 102 may be automatically accepted into the active onboard system. However, the aircrew 112 is free to stop the input from being accepted by intervening within the specified time period to manually reject the input. In other embodiments, the aircrew 112 may also restore the avionics previous state through an undo feature if the accepted speed target in the FMS 108 is no longer valid or was accepted in error.

Figure 2:
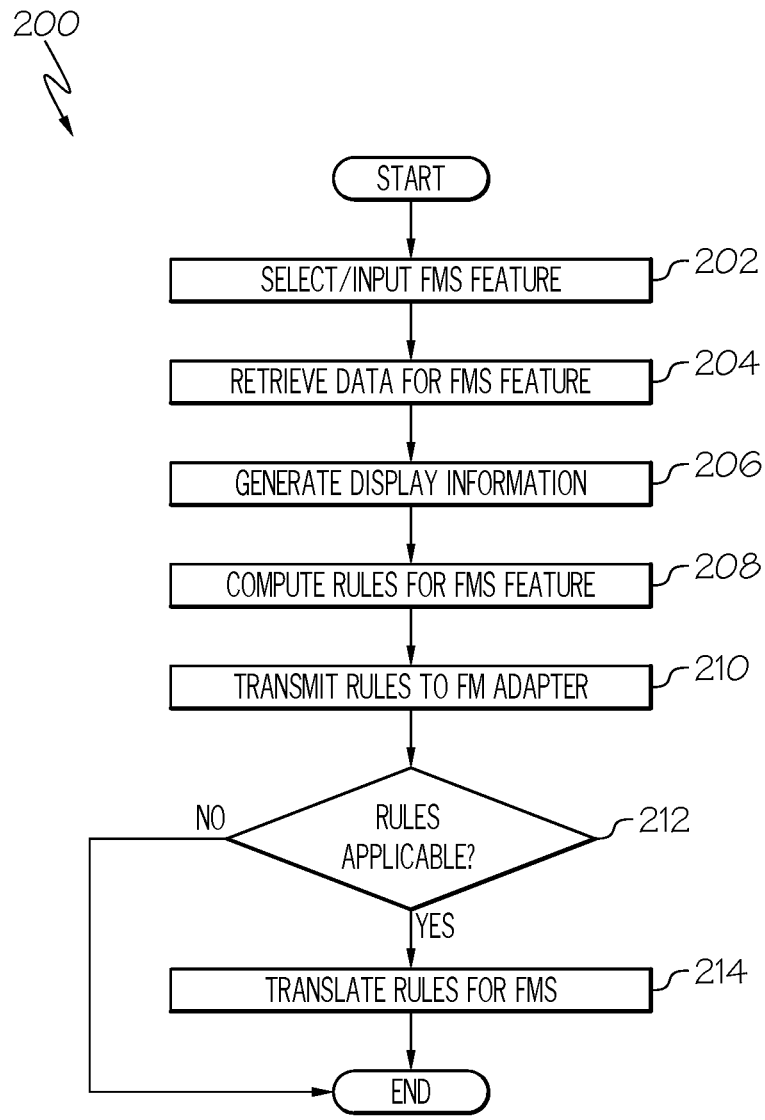
FIG. 2 shows a flowchart of a method for integrating parameters generated by a offboard PED into an onboard FMS in accordance with one embodiment.

Turning now to FIG. 2, a flowchart 200 for a method for enabling features generated by a PED into an onboard FMS is shown in accordance with one embodiment. In this embodiment, a PED is pre-loaded with the software for implementing the advanced avionics features. Examples of a PED may include a smart tablet or a Class 1 or 2 electronic flight bag (EFB). Examples of software may include a strategic planning engine (SPE), which is a standalone component carved out of certified software containing advanced features of a next-generation flight management system (NGFMS) baseline.

First, the FMS enabled features to be used by the PED are selected 202. The PED will access and load the selected aircraft avionics data 204 that is relevant for the selected FMS features. The aircraft avionics data may include: aircraft position, aircraft state, weather data, radar data, traffic data, etc. through flight parameter data sources. This data will be synchronized with the PED which may have access to the same databases used by the onboard avionics such as navigation, weather, etc. In other embodiments, the FMS may provide the flight parameter data to the PED prior to its computations.

Display information for the selected FMS features and the avionics data is generated for the aircrew 206 via an onboard graphic display. Upon a manual aircrew request or at a predetermined time period, the PED will perform computations to generate provisional rules necessary to accomplish a target for the selected FMS feature 208. A "rule" is defined as a condition/action pair that is applicable in a specific context. For example, a rule may state that if a specific condition exists, then a defined action will take place according to the data used within the condition or action. Examples of the selected features for which rules may be generated may include: flight interval management (FIM) between aircraft; required time of arrival (RTA) calculations; etc.

The generated provisional rules by the PED are fed into a pluggable FM adapter module for the legacy avionics 210 onboard the aircraft. The FM adapter ensures that the provisional rules generated from the PED lie within the operational limits of the aircraft 212. If the provisional rules are within the applicable operational limits, the FM adapter translates the provisional rules into operational flight parameter targets for the aircraft and then feeds them into the FMS 214 to seamlessly provide aircraft guidance and predictions using the PED generated data. For example, a speed target generated from a PED in order to comply with an RTA may be confirmed to be within the range of the aircraft safety envelope. The FM adapter has the authority to automatically accept or reject any PED generated targets. Certification of the pluggable onboard avionics FM adapter component is typically required by an aviation regulatory agency. In some embodiments, an additional manual check may be made by the aircrew on the PED display before submitting the target to the onboard avionics.

In other embodiments, the provisional rule may be fed into a "what-if" simulator in the onboard avionics system with the output viewed on the onboard graphic display systems to check for safety envelope violations. The simulator may also include color-coded decision aids to assist the aircrew. These results will be available for a predetermined period of time where the aircrew may reject or accept the target. Upon completion of the time period, the target and associated rules are fed into the active aircraft avionics system. A snapshot of the existing state of the system may be taken to allow the aircrew to perform an undo operation that will instantly restore the system back to the state prior to the PED target input.

Figure 3:
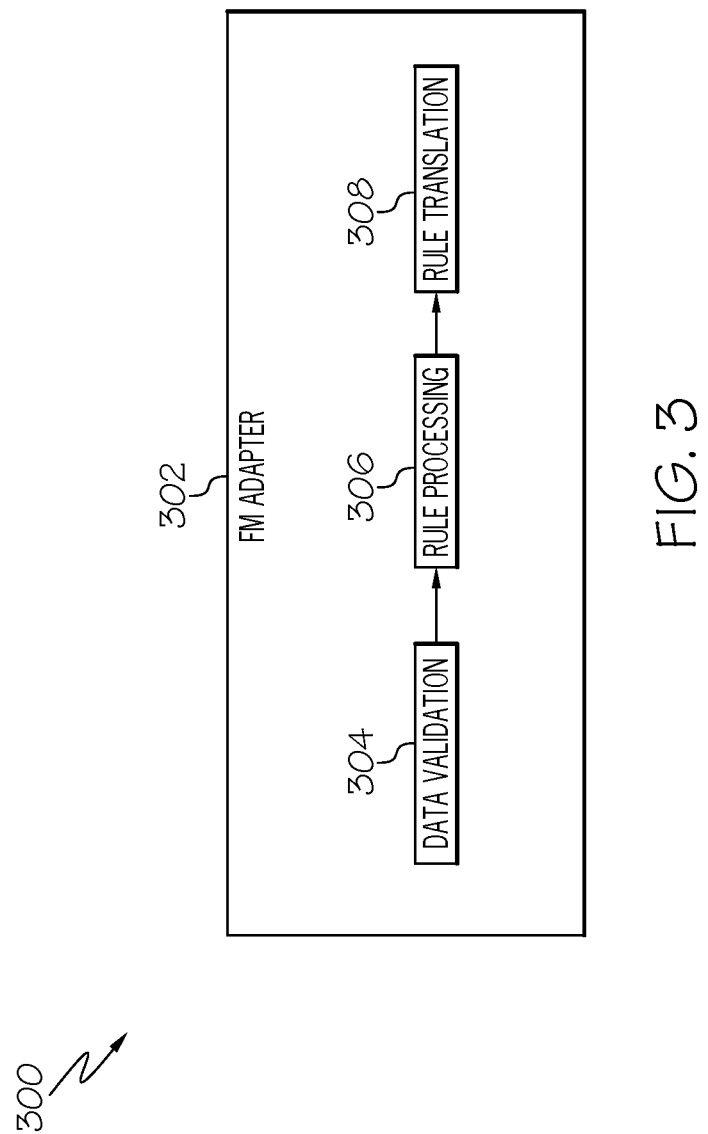
FIG. 3 shows a block diagram of the operation of a flight management (FM) adapter in accordance with one embodiment.

Turning now to FIG. 3, a block diagram 300 of the operation of a flight management (FM) adapter 302 is shown in accordance with one embodiment. As previously mentioned, the FM adapter 302 may receive flight parameter data from the offboard PED and the FMS. The FM adapter 302 may in turn provide the necessary data to each component. For example, the FM adapter 302 may retrieve current flight data from the FMS and provide the data to the PED that is necessary for its computation of provisional rules. The computed provisional rules are then validated, processed and translated for use by the FMS. In this embodiment, three separate functions are used by the adapter including: data validation 304; rule processing 306; and rule translation 308. The data validation process 304 is used to ensure that the data is in a valid and useable format. It may include a cyclic redundancy check (CRC), a time step validation and a format validation of the data. The rule processing step 306 is used to process that data to generate provisional rules to achieve the target functions of the FMS. It may include a flight plan sequence comparison and flight phase of applicability analysis. Finally, the rule translation 308 step may include decoding and translating the data into a useable format for the FMS.

Figure 4:
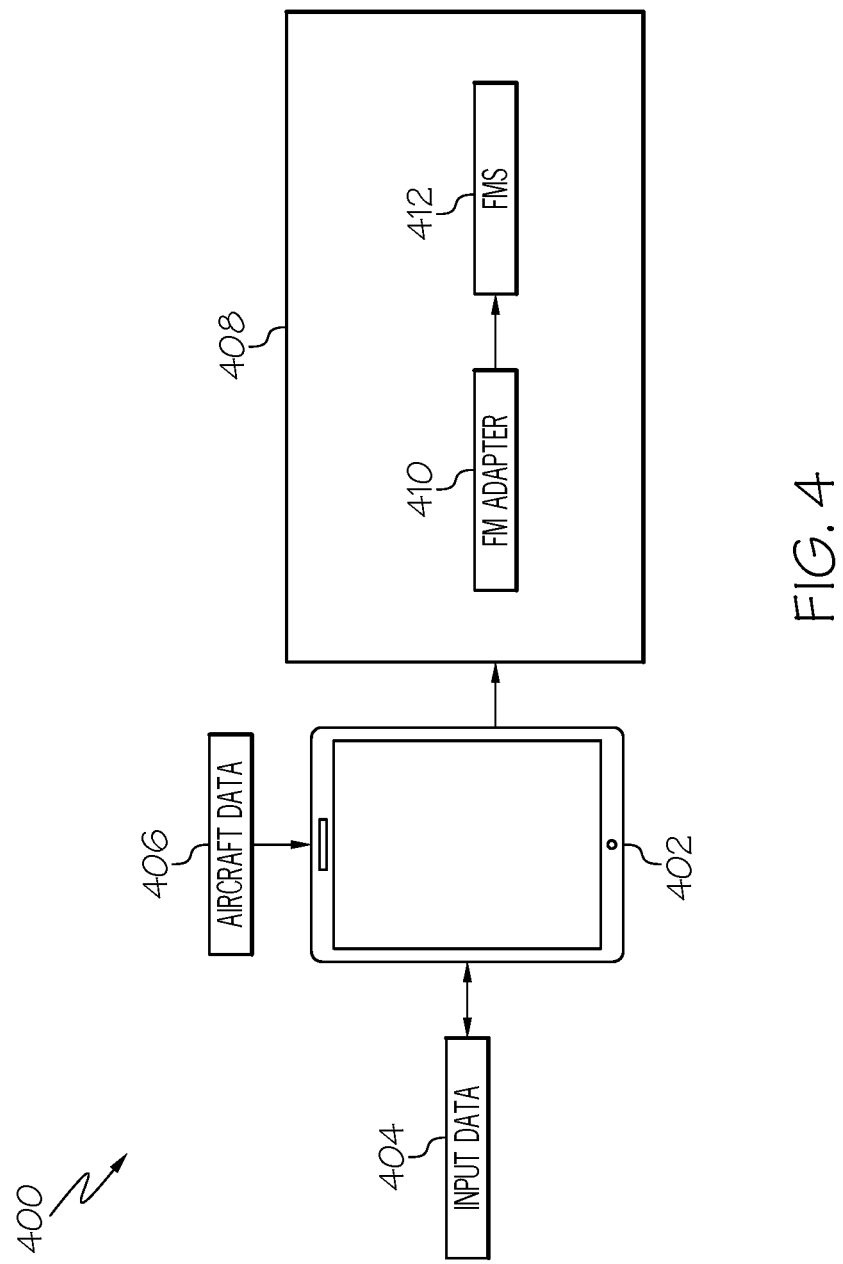
FIG. 4 shows a block diagram of an example of a flight interval management (FIM) application in accordance with one embodiment.

Turning now to FIG. 4, a block diagram 400 of an example of the use of a FIM application is shown in accordance with one embodiment. In this example, the aircrew first selects FIM operations in order to manage the proper flight interval between aircraft. The aircrew enters the necessary inputs 404 for the FIM operation into the offboard application stored on an offboard PED 402. The inputs are typically received from the air traffic controller (ATC). They may include: the separation distance and time between aircraft; the target aircraft identification; and maintenance points along the flight path. The offboard device will retrieve aircraft data 406 such as the four-dimensional (4D) trajectory (i.e., latitude, longitude, altitude and time) for the aircraft and the target aircraft via an automatic dependent surveillance-broadcast (ADS-B) system. The offboard PED 402 will then compute a speed command for the aircraft to maintain its separation and send it to the flight management (FM) adapter 410 that is part of the onboard systems 408. The FM target adapter 410 translates the offboard speed command to a high priority speed rule and then loads the command into the FMS 412 speed model. The FMS 412 will use the offboard speed rule to generate the speed command is necessary to maintain the required separation between aircraft.

Figure 5:
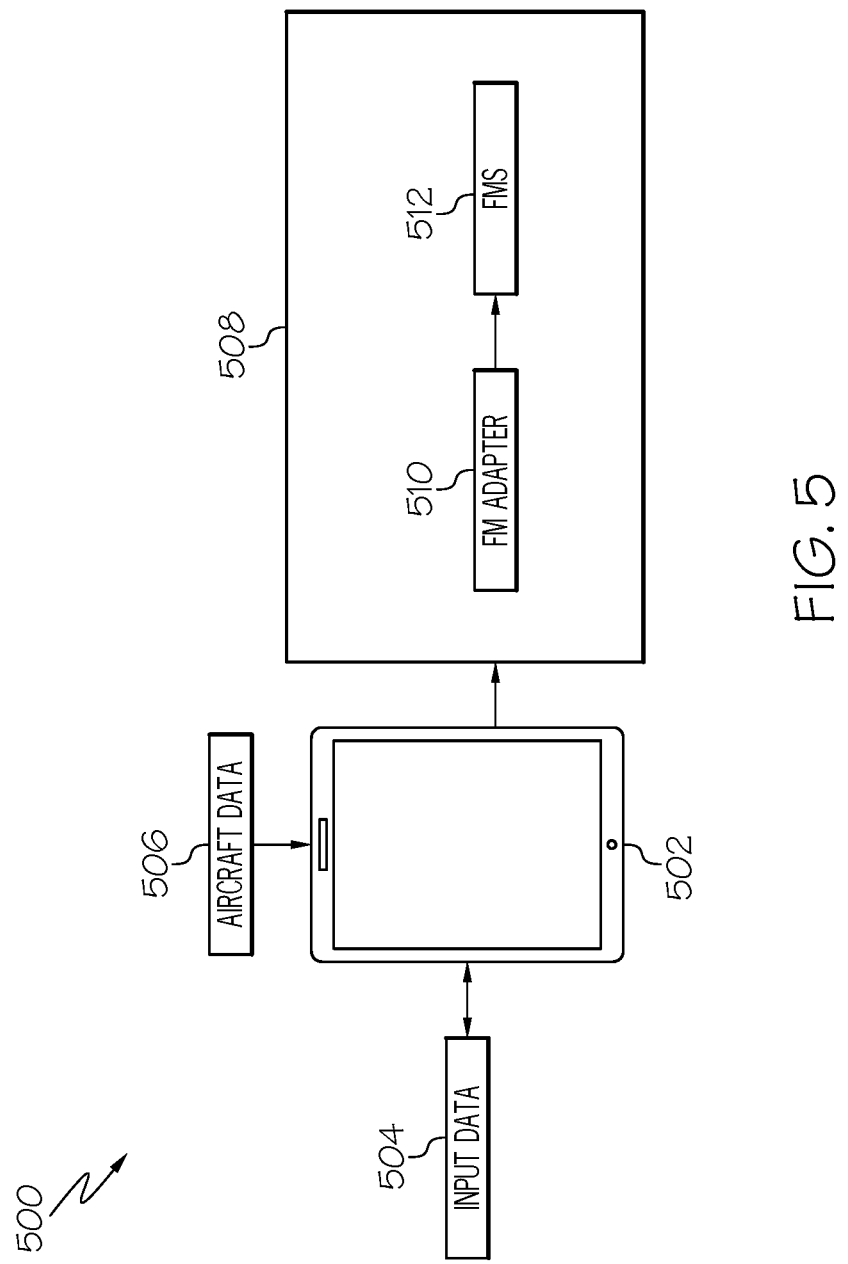
FIG. 5 shows a block diagram of an example of a required time of arrival (RTA) application in accordance with one embodiment.

Turning now to FIG. 5, a block diagram 500 of an example of the use of a required time of arrival (RTA) application is shown in accordance with one embodiment. In this example, an air crew member manually enters an RTA fix 504 that was received from ATC into an application loaded on a offboard PED 502. The offboard application retrieves aircraft data 506 such as real-time weather from an external service provider as well as the aircraft's own 4D trajectory via ADS-B. The offboard application computes the estimated time of arrival (ETA) min/max report and sends it to the ATC along with the aircraft trajectory. The ATC provides the RTA fix for the aircraft that is entered into the offboard application. The application will then compute flight phase specific speed constraints and limits along with a new descent speed profile as required to meet the RTA. These calculations are sent to the FM adapter 510 that is part of the onboard system 508. The FM adapter 510 translates the offboard generated speed commands into high-priority flight phase speed rules and loads the commands into the FMS 512 speed model. The FMS 512 uses the offboard speed rule to generate the speed commands necessary to meet the RTA. The offboard device may continually monitor the aircraft's 4D trajectory and provide updated speed adjustments necessary to meet the RTA. In the event that the RTA cannot be met with speed adjustments, an appropriate message is flagged on the device for aircrew/ATC notification. In alternative embodiments, the monitoring of the rules by the offboard device may be in real time, periodically, or upon manual command by the aircrew.

Figure 6:
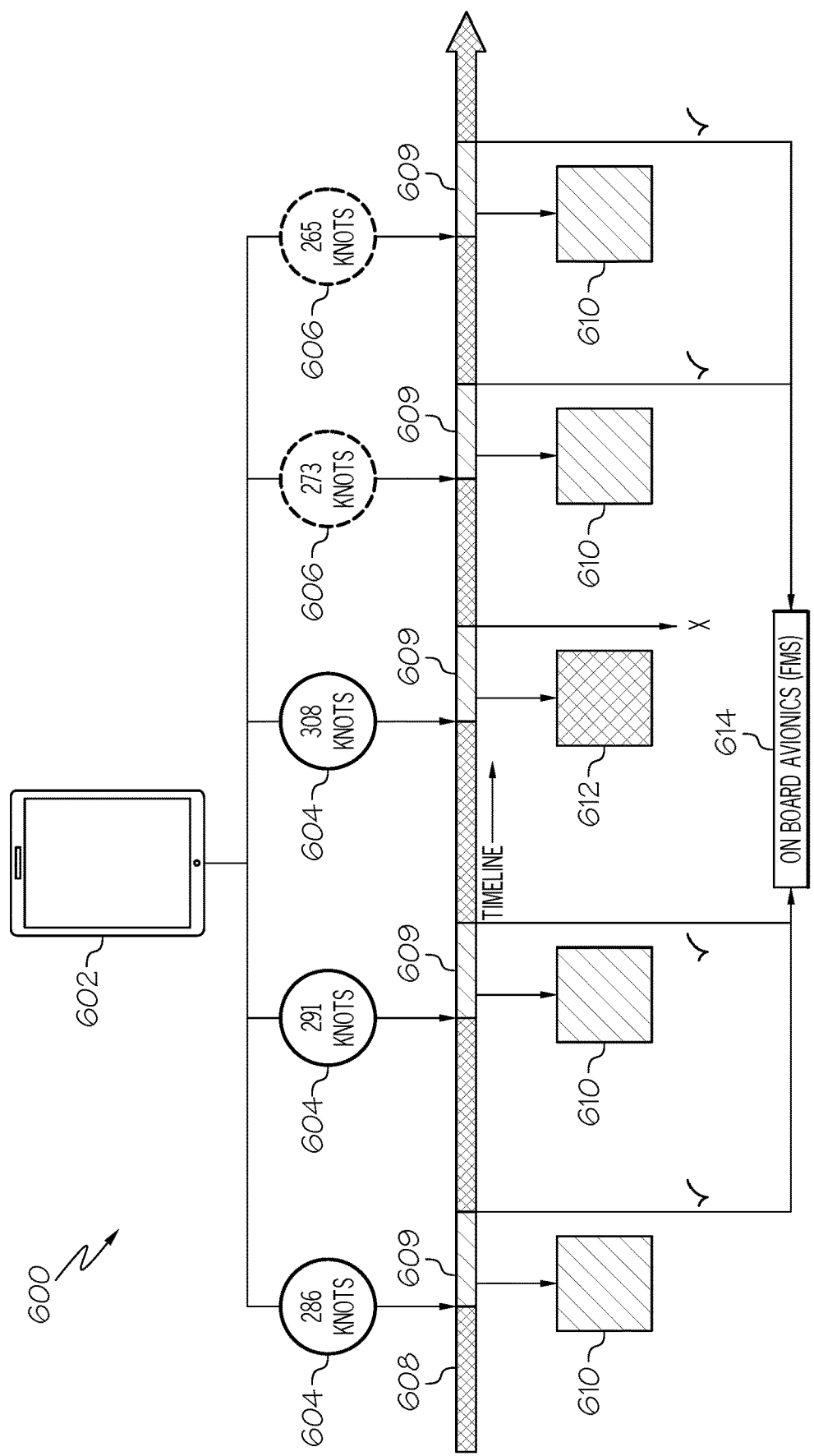
FIG. 6 shows a block diagram of an example of an application for generation of aperiodic speed targets in accordance with one embodiment.

Turning now to FIG. 6, a block diagram 600 of an example of an aperiodic speed target rule generation application is shown in accordance with one embodiment. In this example, the offboard software application loaded on a PED 602 calculates RTA 604 and FIM 606 speed targets. The speed targets 604, 606 are applied at different points along the flight path timeline 608 of the aircraft. Each target 604, 606 includes a predetermined time period 609 for aircrew review. During the review period 609, the aircrew may acknowledge that the speed target is good input 612 that conforms to the objective or bad input 612 that does not conform to the objective. The bad input may be rejected and not fed into the onboard avionics device 614 such as a FMS. However, the good input 610 may either be manually accepted by the aircrew or automatically fed into the onboard avionics 614 at the end of the aircrew review time 609 after giving the aircrew a chance for review.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for integrating aircraft flight parameters generated by an offboard portable electronic device (PED) into an onboard flight management system (FMS), comprising:
   selecting the aircraft flight parameters to be generated by the PED for use by the FMS;
   accessing current flight data for the aircraft with the FMS and providing the current flight data to the offboard PED;
   computing rules for the aircraft flight parameters with the offboard PED based on the current flight data for the aircraft;
   transmitting the rules for the aircraft flight parameters to a flight management (FM) adapter;
   confirming with the FM adapter that the rules for the aircraft flight parameters comply with operational limits of the aircraft;
   translating with the FM adapter the rules of the aircraft flight parameters with the FM adapter to aircraft operational targets for use by the onboard FMS; and
   loading the aircraft operational targets from the FM adapter into the FMS.

2. The method of claim 1, further comprising:
   confirming with input from an aircrew member of the aircraft that the aircraft operational targets loaded into the FMS are valid.

3. The method of claim 2, where the air crew member may undo the loading of the aircraft operational targets into the FMS.

4. The method of claim 2, where the validity of the aircraft operational targets is confirmed prior to loading into the FMS.

5. The method of claim 1, further comprising:
   rejecting with the FM adapter the rules for the aircraft flight parameters that fall outside aircraft safety parameters.

6. The method of claim 1, where the aircraft flight parameters generated by the PED comprise pre-flight planning parameters.

7. The method of claim 1, where the aircraft flight parameters generated by the PED comprise in-flight optimization parameters.

8. The method of claim 1, where the aircraft flight parameters generated by the PED comprise in trail procedures (ITP).

9. The method of claim 1, where the aircraft flight parameters generated by the PED comprise updated maps.

10. The method of claim 1, where the aircraft flight parameters generated by the PED are used for flight interval management (FIM).

11. The method of claim 1, where the aircraft flight parameters generated by the PED are used for real time of arrival (RTA) management.

12. The method of claim 1, where the rules of aircraft flight parameters are translated to aircraft operational targets and loaded into the FMS in real time.

13. The method of claim 1, where the rules of aircraft flight parameters are translated into aircraft operational targets and loaded into the FMS periodically.

14. The method of claim 1, where an aircrew member may manually suspend the translation of aircraft flight parameters for a specified time period.

15. A system for integrating aircraft flight parameters generated offboard an aircraft into an onboard management device, comprising:
   a portable electronic device (PED) that retrieves selected current flight data from a flight data source, where the PED computes rules for selected aircraft flight parameters based on the current flight data;
   a flight management (FM) adapter that receives the computed rules for the selected flight parameters from the PED, where the FM adapter confirms that the computed rules comply with the operational limits of the aircraft and translates the computed ruled into aircraft operational targets; and
   a flight management system (FMS) that receives and loads the aircraft operational targets from the FM adapter.

16. The system of claim 15, further comprising:
   a graphical display device that displays the aircraft operational targets loaded in the FMS.

17. The system of claim 15, where the PED comprises an electronic flight bag (EFB).

18. The system of claim 15, where the PED comprises an electronic tablet.

* * * * *